United States Patent [19]

Bech

[11] 4,058,049
[45] Nov. 15, 1977

[54] ANCHOR ROPE

[76] Inventor: Johan H. Bech, 1265 Tanglewood Court, La Salle, Ontario, Canada

[21] Appl. No.: 669,386

[22] Filed: Mar. 22, 1976

[51] Int. Cl.² .................... D04C 1/12; B63B 21/22
[52] U.S. Cl. .................................. 87/8; 57/142; 114/293; 294/74
[58] Field of Search ............... 87/6, 7, 8; 57/149, 57/142, 146, 147, 159; 114/293–295, 299, 311; 294/74, 82 R

[56] References Cited

U.S. PATENT DOCUMENTS

| 1,050,748 | 1/1913 | Paulsson | 87/6 |
| 2,894,366 | 7/1959 | Leckie | 57/149 |
| 3,338,046 | 8/1967 | Baur et al. | 57/142 X |
| 3,366,002 | 1/1968 | Meals et al. | 57/142 X |
| 3,367,102 | 2/1968 | Meger | 57/142 |
| 3,400,628 | 9/1968 | Herzog | 87/6 |
| 3,623,397 | 11/1971 | Hayashi et al. | 87/6 |

Primary Examiner—John Petrakes
Attorney, Agent, or Firm—Charles Krassov

[57] ABSTRACT

This invention consists of a weight loaded rope for attachment to an anchor for the purpose of increasing the weight of the anchor without increasing its size. It consists of providing a flexible strand or strands of a heavy metal to be included with the other strands which make up the said rope, whether it is a stranded or braided rope. The additional weight strand provided to the rope may also consist of heavy metal beads which are strung together to form the weight strand; or it may consist of a flexible tubular container which is filled with such metal beads.

4 Claims, 5 Drawing Figures

ANCHOR ROPE

This invention consists of an anchor rope used primarily with small crafts and yachts.

An anchor is a device used for many years in navigation for mooring boats to hold them securely in a desired location while floating in waters. It consists chiefly of a central shaft from which extend various types of prongs which bite into the bed of the waters. A rope, cable, or chain is attached to the anchor at one end while the other end is attached to the boat.

From the above description it is obvious that the degree of security by means of which the boat is held depends upon the tensile strength of the rope, cable, or chain, and upon the depth to which the anchor has sunk into the bed of the waters, since the deeper it sinks the stronger is the grip. Furthermore, since there is no available outside force to press the anchor into the bed, the depth to which the anchor will sink depends entirely upon the total weight of the anchor and its means of attachment to the boat.

Of course, when used in conjunction with small boats or yachts, the weight and consequent size of the anchor is limited to the weight that can be handled manually, and to the available storage capacity of the boat; i.e. the anchor has to be physically as small as possible but its weight has to be as large as possible.

These requirements are accomplished in this invention by providing additional weight to the anchor by means of increasing the weight of the rope to which the anchor is attached without the use of metal chains.

In describing the invention reference will be made to the attached drawings in which, FIG. 1 is an elevation of the invention.

Figure 4:
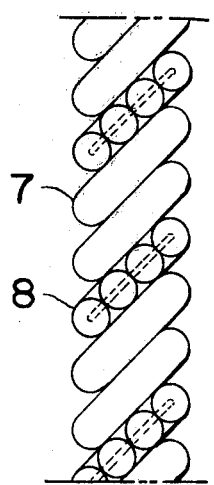
FIG. 4 shows a variation in the construction of the invention.
Figure 2:
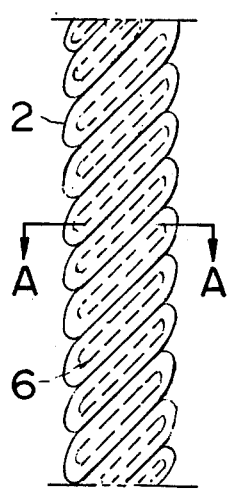
FIG. 2 is an enlargement of the weight carrying part of the anchor rope.
Figure 3:
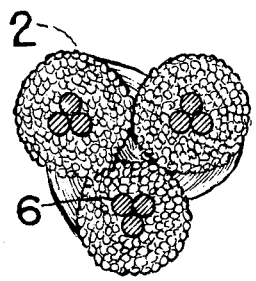
FIG. 3 is section A—A shown in FIG. 2.

The anchor rope shown in the drawings consists of a standard, usually three stranded rope 1 preferably of polypropylene or nylon or nylon fibres 7, which is spliced to a rope 2 by means of an interwoven splice 3. The rope 2 differs from the rope 1 in that it contains an internal core strand 6 of several soft, flexible heavy metal wires stranded or braided together. This core strand is preferably made of lead wires because of the heavy weight characteristic of this metal, because it is resistant to corrosion, and because of its flexibility.

The weighted rope 2, to which the anchor is attached, terminates in a loop which contains a thimble 4. The rope 2 winds around the thimble 4 and is spliced to itself by means of an interwoven splice 5. The anchor is attached to this loop by various means such as anchor shackles or similar devices.

Figure 5:
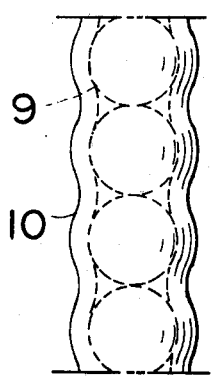
FIG. 5 shows another variation in the construction of the invention.
Figure 1:
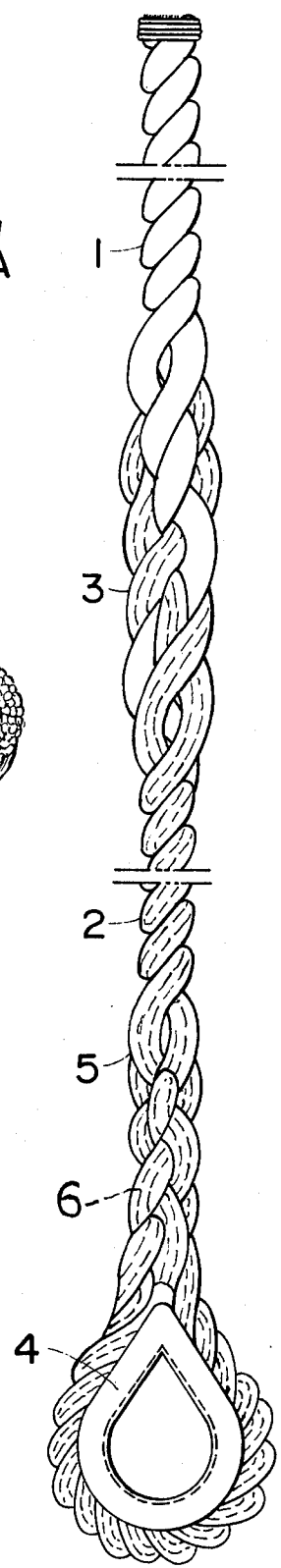

Although the above description shows a rope made of twisted strands, it is intended that it serve as an example only, the rope can be of the braided type or it may be constructed as shown in FIGS. 4 and 5. In FIG. 4, the weighted rope is shown consisting of the usual twisted strands of various fibres, but it also contains a strand made of heavy metal beads 8 which are strung on a flexible wire or string; while FIG. 5 shows the weighted rope consisting of a tubular container 10 made of a flexible material and containing therein heavy metal beads 9 which fit snugly into the container 10, one directly above the other, to fill the container. The beads 8 and 9 are shown to be spherical in shape, however, they may serve the purpose equally as well, if made cylindrical or of any other suitable shape.

Some of the many valuable features and advantages in the use of this invention can be listed as follows, a. The extra weight of the rope provides a deeper and firmer grip of the water bed by the anchor, thereby insuring greater security to the boat.

b. This rope replaces the use of chain to provide the extra weight to the anchor, thereby eliminating the foulling of the anchor by the chain, which is a common occurance.

c. The flexibility of this rope makes it easy to store when not in use, in small volume areas, and is easily available and removable from such storage areas.

d. The metal weight adding components are entirely or mostly covered with the soft parts of the rope so that denting or amrring of the boat surface is eliminated.

e. Usually the dropping of the anchor involves attaching the anchor to the anchor chain, and the anchor chain to the rope. By the use of this invention, the rope is coiled around the anchor when stored, so that in case of emergency, the anchor can be dropped immediately, eliminating all the time involved in connecting the various items as described above.

Having described the invention, what I claim is:

1. A rope for attaching an anchor thereto comprising a long section of rope made of twisted or braided strands of natural or synthetic fibre, in combination with a short section of rope which forms the anchor attachment end of said rope, which is formed into a loop by means of which the anchor is attached thereto; said short section of anchor attachment rope being provided with a flexible strand of heavy metal therein for the purpose of adding extra weight to the anchor, without reducing the flexibility of the said long section of rope.

2. A rope such as described in claim 1 in which the said heavy metal strand consists of a plurality of twisted metal wires, or metal cable, located within and totaly enclosed by said fibre strands.

3. A rope such as described in claim 1 in which the heavy metal strand consists of a string of heavy metal beads which is twisted or braided with the said fibre strands.

4. A rope such as described in claim 1 in which the heavy section of rope consists of a tube of flexible material which is filled on the inside thereof with heavy metal beads.

* * * * *